Figure 1:
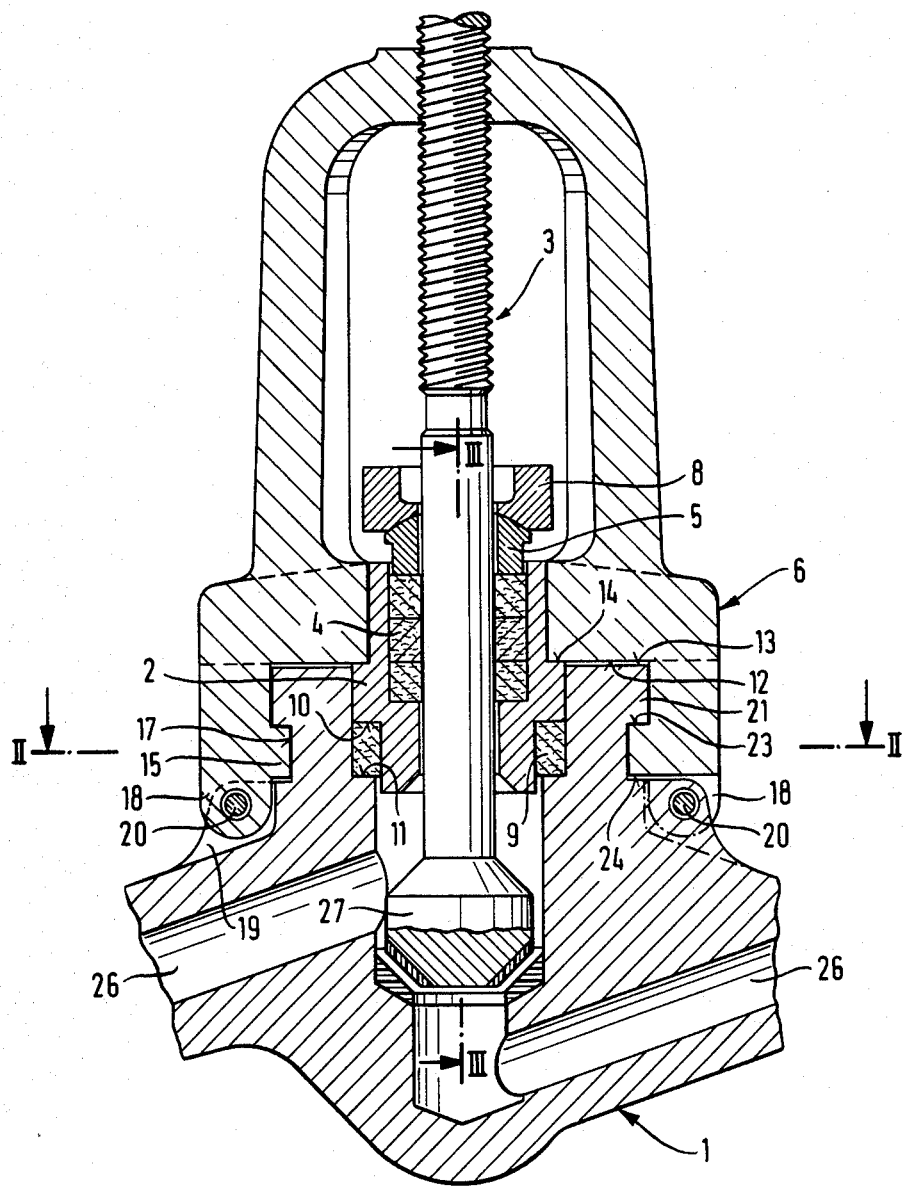

United States Patent [19]

Uomala et al.

[11] Patent Number: 4,509,719
[45] Date of Patent: Apr. 9, 1985

[54] VALVE COVER SEALING

[75] Inventors: Vilho Uomala; Jouko Kärkkäinen; Kjell Sandström, all of Pietarsaari, Finland

[73] Assignee: Oy Wartsila Ab, Helsinki, Finland

[21] Appl. No.: 475,861

[22] Filed: Mar. 16, 1983

[30] Foreign Application Priority Data

Mar. 24, 1982 [FI] Finland .................................. 821044

[51] Int. Cl.³ ............................................. F16K 31/34
[52] U.S. Cl. .................................... 251/214; 137/315; 251/292; 251/367
[58] Field of Search ................ 137/315, 329; 251/214, 251/292, 367

[56] References Cited

U.S. PATENT DOCUMENTS 3,275,290 9/1966 Siver .................................. 251/214

Primary Examiner—Carroll B. Dority, Jr.
Attorney, Agent, or Firm—John Smith-Hill

[57] ABSTRACT

A valve comprises a valve housing with a detachable lid, a spindle passing through the lid and clamping means for clamping the lid to the housing. The clamping force of the clamping means acts mainly in the axial direction of the valve spindle. The lid is secured between the valve housing and a clamping member. The clamping force is transmitted to one side of the lid from the clamping member and to the opposite side of the lid from the valve housing via a gasket member. The valve housing comprising guiding means for guiding and locking the clamping member into a locking position. The guiding means requires subsequent movements, one in the axial direction of the spindle and one in the form of a rotational movement around the spindle. The gasket member is elastically compressible by at least 5%, thereby maintaining a continuous sealing contact pressure between the gasket member and the lid as well as between the lid and the clamping member.

10 Claims, 3 Drawing Figures

VALVE COVER SEALING

The invention relates to a valve comprising a valve housing with a detachable lid, a spindle passing through said lid and clamping means for clamping the lid to said housing, the locking force of said clamping means acting mainly in the axial direction of said valve spindle.

In valves suitable for high temperatures and pressures, the tightness of the junction between the lid and the valve housing is particularly important. A tight connection can be obtained, for instance, by means of a bolt junction, which must be prestressed relatively hard. This results in a clumsy construction which, nevertheless is not reliable enough. Integral valve housings have also been built without any valve housing lid. A valve of this kind is difficult to service. A further difficulty is the lack of the so-called back seal function in the open-position of the valve. Valves are also known, in which the lid is attached to the housing by a threaded junction secured by welding. This junction is tight but expensive and valve service is complicated.

The object of the invention is to provide a valve, which remains tight under severe stress caused by wide variations in temperature and pressure inside the valve, but, nevertheless, is easy and uncomplicate to service through the opening left free by a detachable lid.

In an embodiment of the invention the lid is clamped between the valve housing and a clamping member. The clamping force is transmitted to the lid from the valve housing and the clamping member, whereby the force transmission from the housing is transmitted via a gasket. By means of guiding members the clamping member is guided into its correct locking position. This guiding is carried out by consecutive movements, one in the axial direction of the valve spindle and a second in the form of a partial rotation around the spindle. Several advantages are gained by using a compressible gasket member having the property of expanding again when the load is removed. Firstly, the same gasket can be used several times. Secondly, deformations in the valve itself do not effect the tightness. Thirdly, the gasket effectively compensates for dimensional inaccuracies in the valve. The elasticity of the gasket gives a sealing contact between the gasket and the lid and a clamping contact between the lid and the clamping member. The applicability of the gasket can easily be verified by checking the force required to obtain clamping of the lid. The gasket member can be made larger than its mounting space, which is a favourable arrangement in valves intended for use at high pressure and/or high temperature.

One favourable embodiment of the invention includes a elastically compressible gasket member capable of a relative compression with maintained elastic properties of at least 5%, preferably 10 ... 25%. The term "elastic" means that the compressed member expands again when the compressing load is released. The gasket can be made of suitable flexible graphite materials. The gasket can be wound from graphite tape. A suitable graphite tape includes binding agents of the order 1% or less.

The guiding means can favourably include grooves, guiding noses or collars. An uncomplicated and reliable guiding and locking means include a bayonet coupling. The compression can be effectivated by having one or several helical surfaces acting on the clamping member. These surfaces can be arranged to allow, in the final locking phase, a small movement backwards in the direction of the valve spindle. This is a variation of bayonet locking. The clamping position of the clamping member can be secured by attaching it to the valve housing by means of a detachable attachment device, a screw, a screw bolt or the like. The attachment device can also be a relatively strong spring element, a spring clip or the like.

Figure 2:
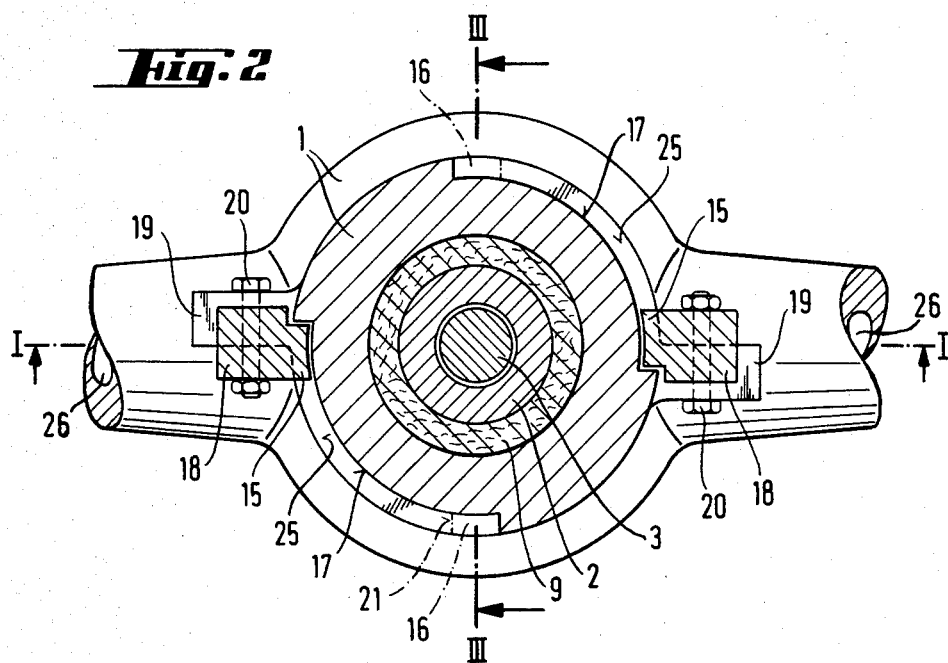
Figure 3:
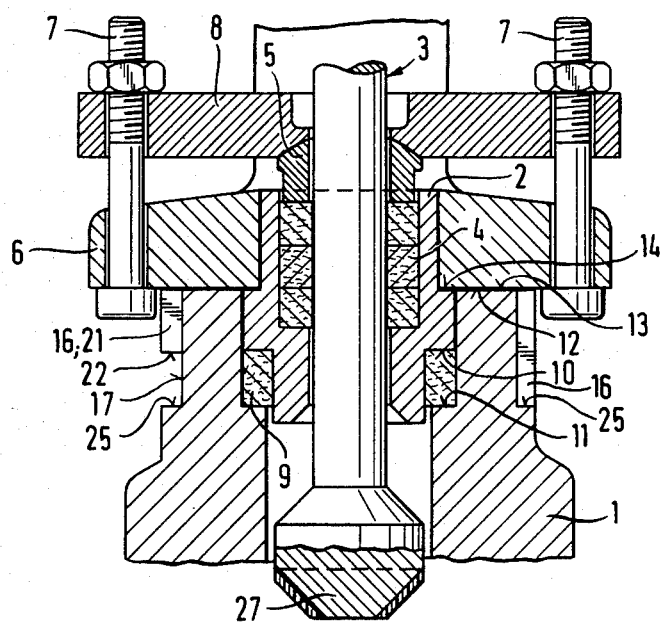

The invention will now be further described, by way of exemple, with reference to the accompanying drawing, in which FIG. 1 is a section of a valve according to the invention in the plane of its flow duct, FIG. 2 is section II—II of FIG. 1, FIG. 3 is a section perpendicular to the flow duct of a part of the valve of FIG. 1.

In the drawing, reference numeral 1 refers to the valve housing and 2 to its lid. A valve spindle 3, which has a valve member 27 at one end, passes through lid 2 and a bore defined by housing 1 so that valve member 27 is positioned within a valve chamber defined by housing 1. Around spindle 3 there are gasket rings 4 axially loaded by a bushing 5. A clamping member 6 is directly attached to valve housing 1. Lid 2 is clamped between housing 1 and clamping member 6. The upper portion of member 6 acts as a spindle supporting member. A support plate 8 transmits a load to bushing 5 and is connected to member 6 by bolts 7. The junction between lid 2 and housing 1 is sealed by a circular elastically compressible gasket 9, which is in contact with a sealing surface 10 on lid 2 and a sealing surface 11 in the valve housing. The axial dimension of gasket 9 is at least 5 mm, preferably 15–30 mm. Pretreated graphite can be used as gasket material. It should allow an elastic compression of at least 5 percent, preferably 10–25 percent. The gasket can be made of flexible graphite tape, having only a minor portion of binding agent, in some cases less than one percent. The axial resilience of gasket 9 should be at least 0.25 mm, preferably 1.5–7.5 mm. A graphite gasket does not undergo any changes of importance during the normal life-time of the valve.

Clamping member 6 is set against the valve housing so that its contact surface 12 faces the corresponding contact surface 13 of the valve housing. When the clamping member is set, a force is transmitted from its contact surface 12 to a load surface 14 of lid 2, whereby gasket 9 is compressed. Housing 1 and clamping member 6 are joined by a bayonet coupling. Two opposite noses 15 in clamping member 6, having top and bottom side surfaces 23 and 24, are, in a first phase, guided by a groove 16 in the axial direction of spindle 3. When noses 15 have reached the bottom 25 of groove 16, gasket 9 is compressed at least mainly to its final state of compression. Clamping member 6 is then rotated clock-wise in FIG. 2, which moves each of noses 15 is a groove 17, until an attachment portion 18 of nose 15 touches a protrusion 19 in the valve housing. The attachment portions 18 are attached to protrusions 19 by attachment screws 20 to secure the bayonet locking. Groove 17 is formed below a collar 21. Its upper side surface 22, cooperating with the top surface 23 of nose 15, can be slightly helical giving a slightly increased compression of gaskets 9 in the final clamping phase. The bayonet coupling can also be locked by a small upwardly directed enlargement at the end of grooves 17.

Numeral 26 indicates the flow duct of the valve.

The invention is not limited to the embodiment shown, but several modifications thereof are feasible within the scope of the attached claims.

We claim:

1. A valve comprising:

a valve housing which defines a valve chamber and a bore extending between the valve chamber and the exterior of the valve housing, and which has a surface surrounding the bore and directed to the exterior of the valve housing;

a detachable valve lid having a surface which confronts said surface of the housing;

an elongate valve spindle passing through said lid and entering the valve chamber;

a gasket member which is fitted between said surface of the valve housing and the confronting surface of the lid and which is elastically compressible by at least 5%; and a clamping member for clamping the lid to the valve housing by means of a clamping force acting mainly in the longitudinal direction of the valve spindle, whereby the gasket member is compressed between the confronting surfaces of the valve housing and the lid and the elasticity of the gasket member maintains a continuous sealing contact pressure between said gasket member and both said lid and said surface of the housing, and wherein the valve housing comprises guiding means for guiding said clamping member into a locking position relative to said valve housing, in which position the lid is clamped to the valve housing, said guiding means requiring at least first and second consecutive movements of the clamping member relative to the valve housing, said first movement being an essentially linear movement in the longitudinal direction of the valve spindle and said second movement being a rotational movement about the spindle.

2. A valve according to claim 1, wherein said clamping member is formed with at least one nose-like member which is arranged to cooperate with said guiding means.

3. A valve according to claim 2, wherein said nose-like member and the guiding means cooperate to form a bayonet coupling for locking the clamping member to the valve housing.

4. A valve according to claim 3, wherein said guiding means are formed to permit limited movement of the clamping member relative to the valve housing in the opposite direction to said first movement at the end of said rotational movement, whereby the clamping member is retained in the said locking position.

5. A valve according to claim 1, wherein said guiding means have a helical guiding surface for guiding the rotational movement of the clamping member, so that the clamping member also moves in said longitudinal direction during the rotational movement so as to compress the gasket member.

6. A valve according to claim 1, comprising a detachable locking device for securing the clamping member to the valve housing to prevent rotational movement of the clamping member relative to the valve house, thereby to retain the clamping member in the locking position.

7. A valve according to claim 1, wherein said surfaces extend in essentially parallel confronting relationship, perpendicular to the longitudinal direction of the valve spindle.

8. A valve according to claim 1, wherein said gasket member is elastic within a compression range of 10 . . . 25%.

9. A valve according to claim 1, wherein said gasket member is a flexible graphite member.

10. A valve according to claim 9, wherein said gasket member comprises graphite tape including a minor amount of a binding agent.

* * * * *